(12) United States Patent
Tsou et al.

(10) Patent No.: US 10,056,823 B2
(45) Date of Patent: Aug. 21, 2018

(54) PROTECTION CIRCUIT APPLIED TO AN ALTERNATING CURRENT POWER SOURCE AND RELATED PROTECTION METHOD THEREOF

(71) Applicant: Leadtrend Technology Corp., Hsin-Chu (TW)

(72) Inventors: Ming-Chang Tsou, Hsin-Chu (TW); Meng-Jen Tsai, Hsin-Chu (TW); Yu-Kun Lin, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 15/011,678

(22) Filed: Feb. 1, 2016

(65) Prior Publication Data

US 2016/0226371 A1    Aug. 4, 2016

Related U.S. Application Data

(60) Provisional application No. 62/111,683, filed on Feb. 4, 2015.

(51) Int. Cl.
| | |
|---|---|
| *H01G 2/12* | (2006.01) |
| *H02M 1/32* | (2007.01) |
| *H02M 7/06* | (2006.01) |
| *H02H 7/16* | (2006.01) |
| *H02J 7/34* | (2006.01) |

(52) U.S. Cl.
CPC .............. *H02M 1/32* (2013.01); *H02M 7/06* (2013.01); *H02H 7/16* (2013.01); *H02J 7/345* (2013.01); *H02M 2001/322* (2013.01)

(58) Field of Classification Search
USPC ...................................................... 361/15–16
See application file for complete search history.

(56) References Cited

U.S. PATENT DOCUMENTS

| | | | |
|---|---|---|---|
| 2012/0105016 A1* | 5/2012 | Moon ..................... | H02M 1/36 320/166 |
| 2012/0112564 A1 | 5/2012 | Wu | |
| 2013/0033236 A1* | 2/2013 | Li ......................... | H02M 7/219 320/166 |
| 2013/0147440 A1* | 6/2013 | Shiroyama ............ | G01R 31/40 320/166 |

FOREIGN PATENT DOCUMENTS

CN            103081322 A       5/2013

* cited by examiner

*Primary Examiner* — Danny Nguyen
(74) *Attorney, Agent, or Firm* — Winston Hsu

(57) ABSTRACT

A protection circuit applied to an alternating current (AC) power source includes a sample-and-hold unit, a detection unit, and a discharge signal generation unit. The sample-and-hold unit samples a peak value of a direct current (DC) voltage during each period of a corresponding AC voltage, wherein the AC power source provides the AC voltage. The detection unit generates a detection signal when the DC voltage crosses a reference voltage corresponding to the peak value. The discharge signal generation unit generates a count signal when the discharge signal generation unit does not receive the detection signal within a predetermined time of a period of the AC voltage, accumulates the count signal, and generates a discharge signal to a discharge unit when a number of accumulated count signals is greater than a predetermined value, wherein the discharge unit discharges an X capacitor according to the discharge signal.

20 Claims, 5 Drawing Sheets

PROTECTION CIRCUIT APPLIED TO AN ALTERNATING CURRENT POWER SOURCE AND RELATED PROTECTION METHOD THEREOF

CROSS REFERENCE TO RELATED APPLICATIONS

This application claims the benefit of U.S. Provisional Application No. 62/111,683, filed on Feb. 4, 2015 and entitled "One-line AC OFF Protection," the contents of which are incorporated herein by reference.

BACKGROUND OF THE INVENTION

1. Field of the Invention

The present invention relates to a protection circuit applied to an AC power source and a related protection method thereof, and particularly to a protection circuit and a protection method that can prevent from misjudging that the AC power source is not turned off when the AC power source is one-line off, resulting in an X capacitor not being discharged in time.

2. Description of the Prior Art

In order to prevent a user from suffering an electric shock when the user touches an electronic device, a circuit safety specification defines that an X capacitor (X-cap) needs to be connected to a discharge resistor in parallel so that a voltage stored in the X capacitor can be discharged to be lower than a safety voltage within a predetermined time when the electronic device is turned off. When the electronic device is turned off, the prior art sometimes only makes an alternating current (AC) power source coupled to the electronic device be one-line off due to consideration of lowering cost of the electronic device (e.g. an N line of the AC power source is one-line off).

However, when the N line of the AC power source AC is one-line off, because an L line of the AC power source still has high impedance, there are not greater difference between a peak value of a direct current (DC) voltage of a high voltage pin of the electronic device coupled to the X capacitor corresponding to the L line of the AC power source and a peak value of the DC voltage of the high voltage pin corresponding to the N line of the AC power source, resulting in the prior art misjudges that the AC power source is not turned off. Therefore, the prior art applied to single open-circuit of the AC power source is not a good choice for the user.

SUMMARY OF THE INVENTION

An embodiment of the present invention provides a protection circuit applied to an alternating current (AC) power source. The protection circuit includes a sample-and-hold unit, a detection unit, and a discharge signal generation unit. The sample-and-hold unit is used for sampling a peak value of a direct current (DC) voltage during each period of a corresponding AC voltage, wherein the AC power source provides the AC voltage. The detection unit is coupled to the sample-and-hold unit for generating a detection signal when the DC voltage crosses a reference voltage corresponding to the peak value. The discharge signal generation unit is coupled to the detection unit for generating a count signal when the discharge signal generation unit does not receive the detection signal within a predetermined time of a period of the AC voltage, accumulating the count signal, and generating a discharge signal to a discharge unit when a number of accumulated count signals is greater than a predetermined value, wherein the discharge unit is used for discharging an X capacitor according to the discharge signal.

Another embodiment of the present invention provides a protection circuit applied to an AC power source. The protection circuit includes a sample-and-hold unit, a detection unit, and a discharge signal generation unit. The sample-and-hold unit is used for sampling a peak value of a DC voltage during each period of a corresponding AC voltage, wherein the AC power source provides the AC voltage. The detection unit is coupled to the sample-and-hold unit for generating a detection signal when the DC voltage crosses a reference voltage corresponding to the peak value. The discharge signal generation unit is coupled to the detection unit for generating a discharge signal to a discharge unit when the discharge signal generation unit does not receive the detection signal again within a predetermined time after the detection signal, wherein the discharge unit is used for discharging an X capacitor according to the discharge signal.

Another embodiment of the present invention provides a protection method applied to an AC power source, wherein a protection circuit applied to the protection method includes a sample-and-hold unit, a detection unit, and a discharge signal generation unit. The protection method includes the sample-and-hold unit sampling a peak value of a DC voltage during each period of a corresponding AC voltage, wherein the AC power source provides the AC voltage; the discharge signal generation unit generating a count signal when the discharge signal generation unit does not receive a detection signal generated by the detection unit within a predetermined time of a period of the AC voltage; the discharge signal generation unit accumulating the count signal; the discharge signal generation unit generating a discharge signal to a discharge unit when a number of accumulated count signals is greater than a predetermined value; and the discharge unit discharging an X capacitor according to the discharge signal.

Another embodiment of the present invention provides a protection method applied to an AC power source, wherein a protection circuit applied to the protection method includes a sample-and-hold unit, a detection unit, and a discharge signal generation unit. The protection method includes the sample-and-hold unit sampling a peak value of a DC voltage during each period of a corresponding AC voltage, wherein the AC power source provides the AC voltage; the discharge signal generation unit generating a discharge signal to a discharge unit when the discharge signal generation unit does not receive a detection signal generated by the detection unit again within a predetermined time after the detection signal; and the discharge unit discharging an X capacitor according to the discharge signal.

The present invention provides a protection circuit applied to an AC power source and a related protection method thereof. The protection circuit and the protection method utilize a sample-and-hold unit to sample a peak value of a DC voltage during each period of an AC voltage when the AC power source is one-line off, and utilize a discharge signal generation unit to generate a discharge signal to a discharge unit when a number of accumulated count signals generated and accumulated by the discharge signal generation unit during consecutive periods of the AC voltage is greater than q predetermined value. In addition, the protection circuit and the protection method thereof can also utilize the sample-and-hold unit to sample a peak value of the DC voltage during each period of the AC voltage when the AC power source is plugged out, and utilize the discharge signal generation unit to generate the discharge signal to the discharge unit when the discharge signal generation unit does not receive the detection signal generated by the detection unit again within a second predetermined time after the detection signal generated by the detection unit. Then, the discharge unit can discharge an X capacitor according to the discharge signal. Therefore, compared to the prior art, the present invention can prevent from misjudging that the AC power source is not turned off when the AC power source is one-line off, resulting in the X capacitor not being discharged in time. In addition, the present invention can also be simultaneously applied to plugging-out of the AC power source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
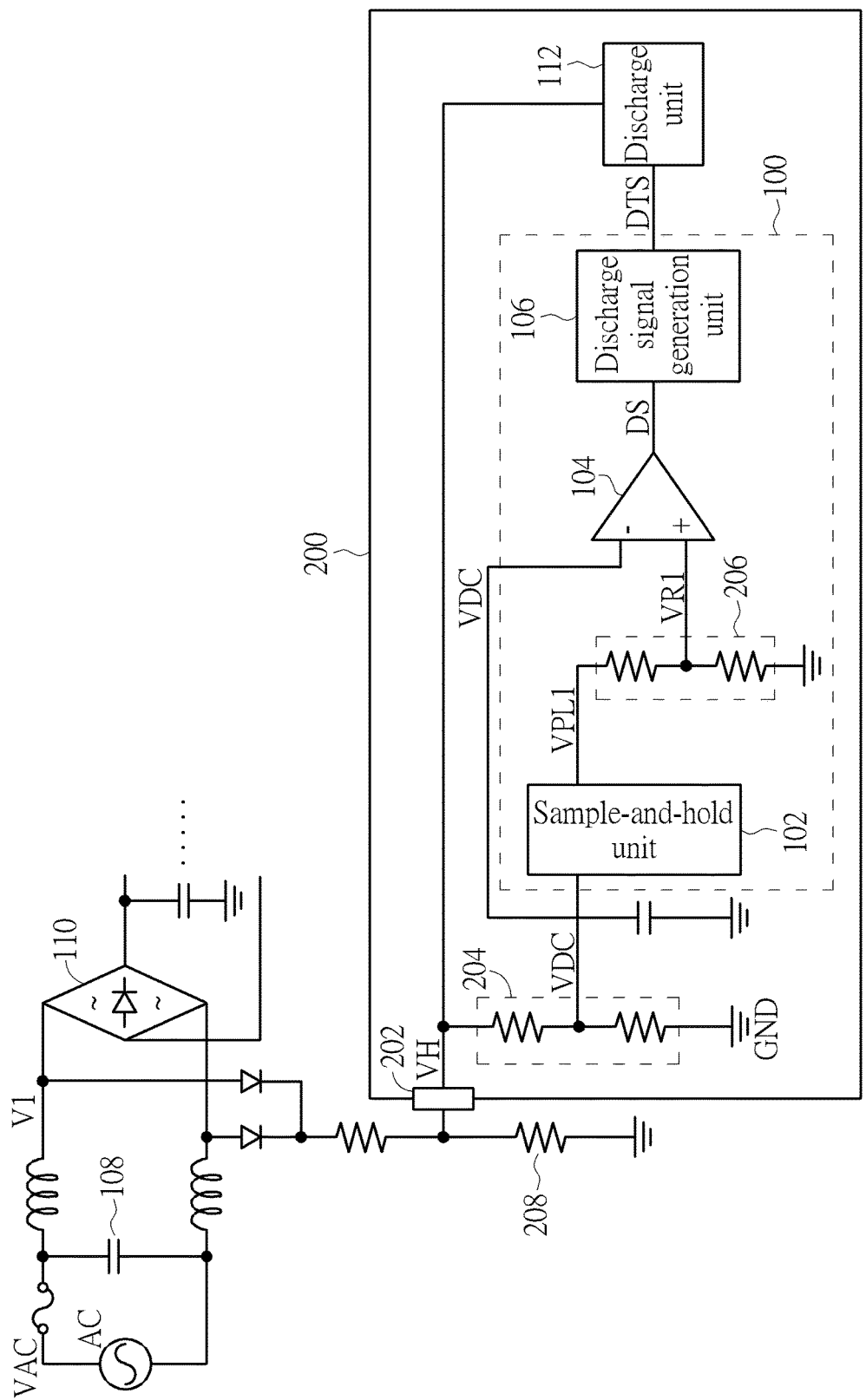
FIG. 1 is a diagram illustrating a protection circuit applied to an alternating current power source according to a first embodiment of the present invention.

Please refer to FIG. 1. FIG. 1 is a diagram illustrating a protection circuit 100 applied to an alternating current (AC) power source AC according to a first embodiment of the present invention, wherein the protection circuit 100 is further applied to a controller 200 of a primary side of a power converter (wherein the power converter is not shown in FIG. 1). As shown in FIG. 1, the protection circuit 100 includes a sample-and-hold unit 102, a detection unit 104, and a discharge signal generation unit 106, wherein the detection unit 104 is coupled to the sample-and-hold unit 102, and the discharge signal generation unit 106 is coupled to the detection unit 104. As shown in FIG. 1, the sample-and-hold unit 102 is coupled to two terminals of an X capacitor 108 through a high voltage pin 202 and a voltage divider 204, wherein the voltage divider 204 is coupled between the high voltage pin 202 and ground GND for providing a direct current (DC) voltage VDC to the sample-and-hold unit 102, wherein the DC voltage VDC corresponds to a voltage VH of the high voltage pin 202. As shown in FIG. 1, because an AC voltage VAC provided by the AC power source AC can be rectified to generate a first DC voltage V1 through a full-wave rectifier 110, and the sample-and-hold unit 102 is coupled to the two terminals of the X capacitor 108 through the high voltage pin 202 and the voltage divider 204, a period of the DC voltage VDC corresponds to a period of the AC voltage VAC (that is, the period of the AC voltage VAC is two times of the period of the DC voltage VDC). In addition, inn another embodiment of the present invention, the protection circuit 100 further includes the voltage divider 204.

Figure 2:
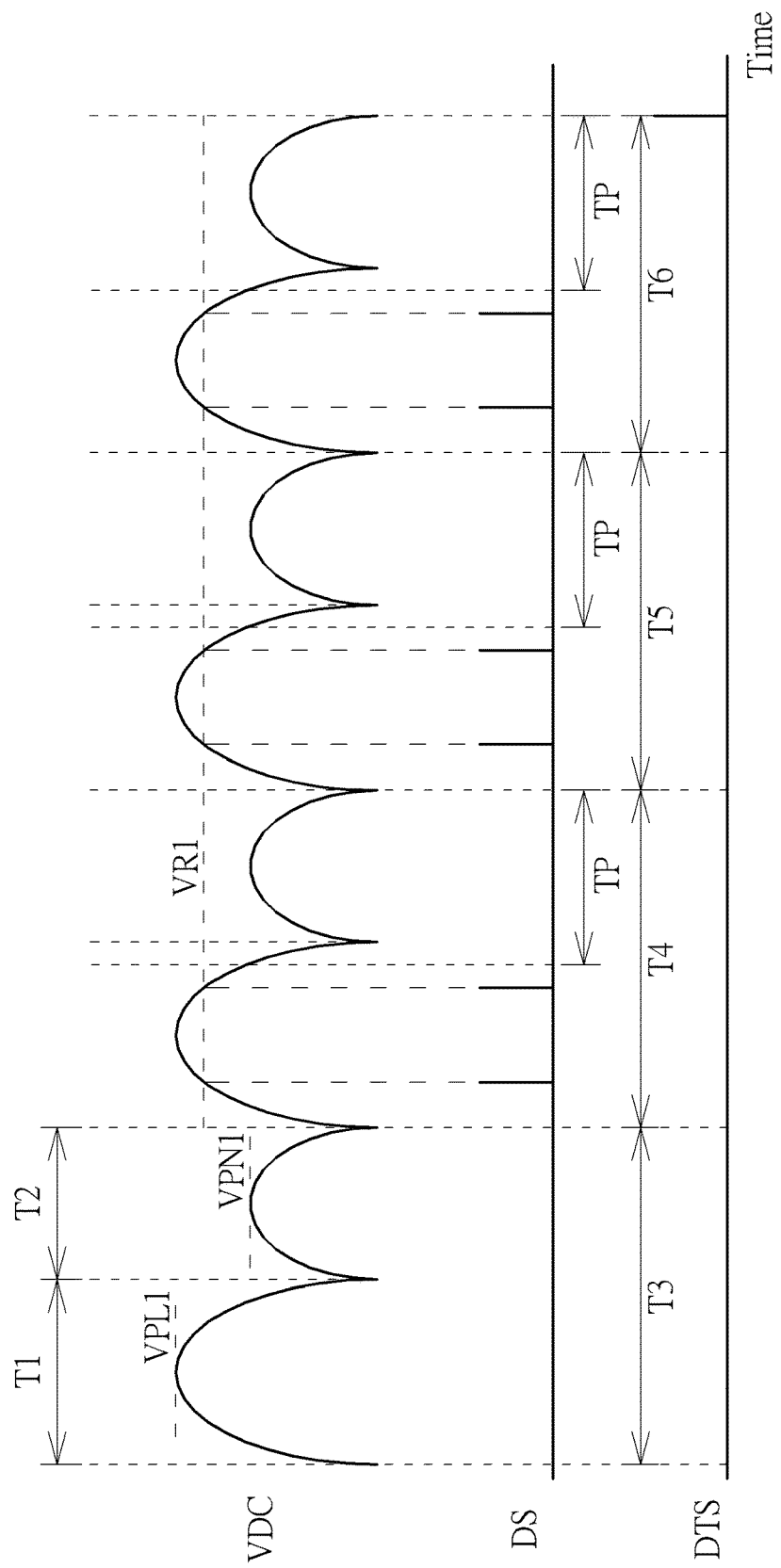
FIG. 2 is a diagram illustrating the DC voltage, the period of the AC voltage, a reference voltage, a detection signal, and a discharge signal when an N line of the AC power source is one-line off.

Please refer to FIG. 2. FIG. 2 is a diagram illustrating the DC voltage VDC, the period of the AC voltage VAC, a reference voltage VR1, a detection signal DS, and a discharge signal DTS when an N line of the AC power source AC is one-line off. But, the present invention is not limited to the N line of the AC power source AC being one-line off, that is, the present invention can also be applied to an L line of the AC power source AC being one-line off. As shown in FIG. 2, when the N line of the AC power source AC is one-line off, the DC voltage VDC is not reduced to zero, but a peak value of the DC voltage VDC (e.g. a peak value VPL1 of the DC voltage VDC during a time interval T1) corresponding to the L line of the AC power source AC is greater than a peak value of the DC voltage VDC (e.g. a peak value VPN1 of the DC voltage VDC during a time interval T2) corresponding to the N line of the AC power source AC, wherein the time interval T1 (that is, the period of the DC voltage VDC) is equal to the time interval T2, and the period of the AC voltage VAC (that is, a time interval T3) is equal to a sum of the time interval T1 and the time interval T2. The sample-and-hold unit 102 is used for sampling a peak value of the DC voltage VDC during each period of the AC voltage VAC. For example, the sample-and-hold unit 102 samples the peak value VPL1 of the DC voltage VDC during the time interval T3, wherein after the sample-and-hold unit 102 samples the peak value VPL1 of the DC voltage VDC, a reference voltage generation circuit 206 (as shown in FIG. 1) coupled to the sample-and-hold unit 102 can generate a reference voltage VR1 corresponding to the peak value VPL1 and the time interval T3 according to the peak value VPL1 (that is, the reference voltage VR1 is changed with the peak value VPL1), and the reference voltage VR1 is set to be between the peak value VPL1 and the peak value VPN1. Because the reference voltage generation circuit 206 generates the reference voltage VR1 according to the peak value VPL1, the reference voltage VR1 corresponds to the voltage VH of the high voltage pin 202 (because the DC voltage VDC corresponds to the voltage VH of the high voltage pin 202). Because the reference voltage VR1 corresponds to the voltage VH of the high voltage pin 202, the reference voltage VR1 can be adjusted by a resistor 208 coupled to the high voltage pin 202. That is to say, when a resistance of the resistor 208 is smaller, a difference between the peak value VPL1 and the peak value VPN1 is greater, so the reference voltage VR1 can be set to be smaller, and when the resistance of the resistor 208 is greater, the difference between the peak value VPL1 and the peak value VPN1 is smaller, so the reference voltage VR1 can be set to be greater. After the reference voltage generation circuit 206 generates the reference voltage VR1 (that is, a time interval T4), when the DC voltage VDC crosses the reference voltage VR1 corresponding to a previous period of the AC voltage VAC (that is, the time interval T3), the detection unit 104 can generate the detection signal DS. The discharge signal generation unit 106 is used for generating a count signal when the discharge signal generation unit 106 does not receive the detection signal DS within a predetermined time TP of a period of the AC voltage VAC, and accumulating the count signal, wherein when the AC voltage VAC is a 60 Hz AC voltage, the period of the AC voltage VAC is equal to 16.7 ms, so the predetermined time TP can be set between T and T/2 (e.g. the predetermined time TP can be set to be equal to 0.6 T (0.6*16.7≅10 ms)), wherein T represents the period of the AC voltage VAC. But, the present invention is not limited to the predetermined time TP being equal to 0.6 T. For example, the discharge signal generation unit 106 can generate a count signal corresponding to the time interval T4 when the discharge signal generation unit 106 does not receive the detection signal DS within a predetermined time TP of the time interval T4 (wherein the time interval T4 is equal to a period of the AC voltage VAC), and accumulates the count signal. When a number of accumulated count signals accumulated by the discharge signal generation unit 106 (e.g. a number of the accumulated count signals accumulated by the discharge signal generation unit 106 during 4 consecutive periods (time intervals T4, T5, T6, . . . ) of the AC voltage VAC) is greater than a predetermined value (e.g. the predetermined value is 3), the discharge signal generation unit 106 generates the discharge signal DTS to a discharge unit 112, and zeros the number of the accumulated count signals, wherein the discharge unit 112 is used for discharging the X capacitor 108 according to the discharge signal DTS, and the discharge unit 112 can discharge a voltage stored in the X capacitor 108 to make the voltage stored in the X capacitor 108 be lower than a predetermined voltage within a first predetermined time (e.g. one second) according to the discharge signal DTS. In addition, when the discharge signal generation unit 106 receives the detection signal DS within the predetermined time TP of the period of the AC voltage VAC, the discharge signal generation unit 106 also zeros the number of the accumulated count signals. In addition, a sum of the resistance of the resistor 208 and parasitic resistors existing between the high voltage pin 202 and the ground GND can be determined by equation (1):

$$C \times R = \frac{TP}{Diff\ \%} \quad (1)$$

As shown in equation (1), C is a capacitance of the X capacitor 108, R is the sum of the resistance of the resistor 208 and the parasitic resistors existing between the high voltage pin 202 and the ground GND, and Diff % is a ratio of a difference between the reference voltage VR1 and the peak value VPL1 to the peak value VPL1.

Figure 3:
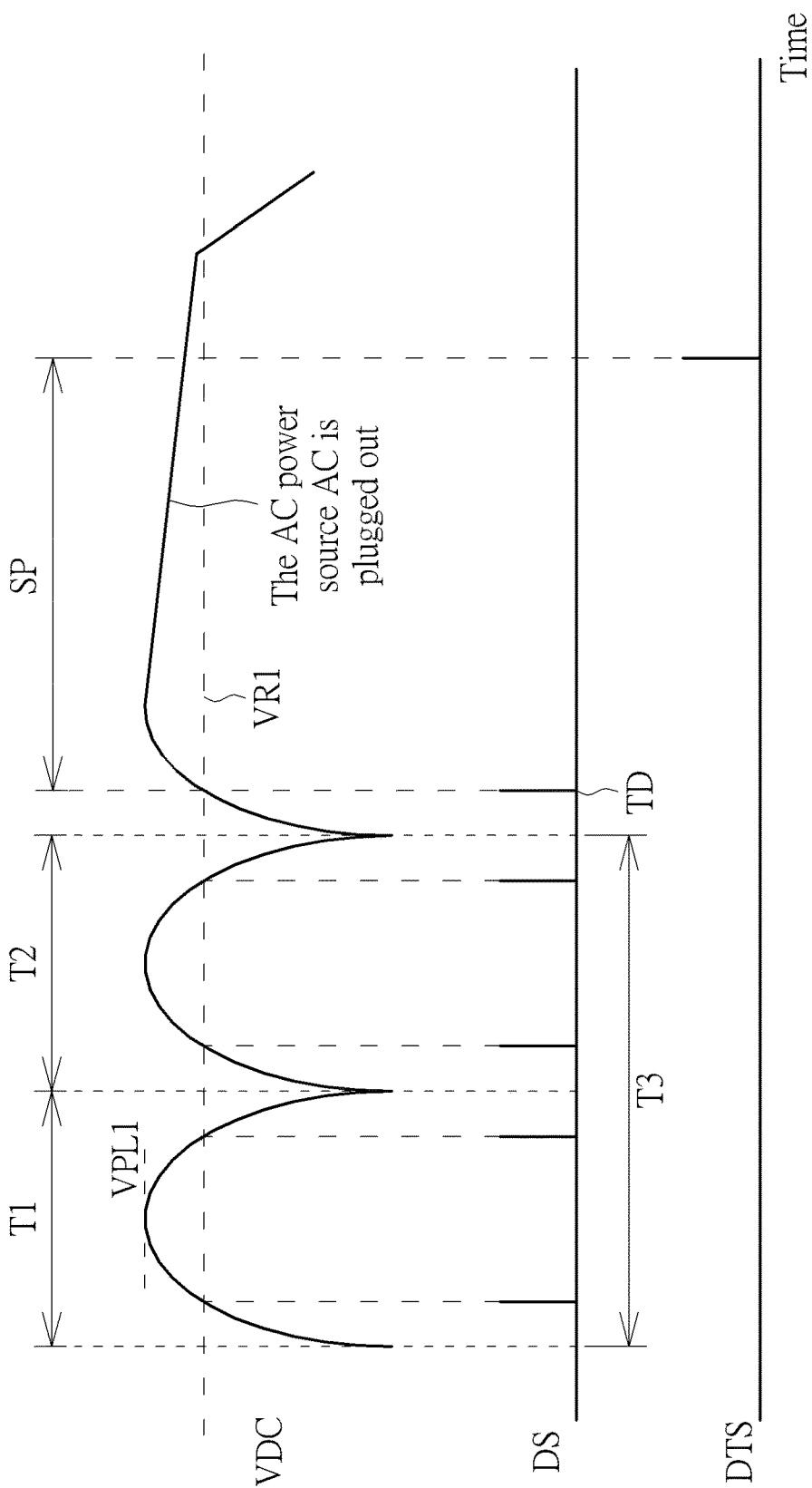
FIG. 3 is a diagram illustrating the DC voltage, the period of the AC voltage, the reference voltage, the detection signal, and the discharge signal when the AC power source is plugged out according to a second embodiment of the present invention.

Please refer to FIG. 3. FIG. 3 is a diagram illustrating the DC voltage VDC, the period of the AC voltage VAC, the reference voltage VR1, the detection signal DS, and the discharge signal DTS when the AC power source AC is plugged out according to a second embodiment of the present invention. As shown in FIG. 3, operational principles of the sample-and-hold unit 102 and the detection unit 104 in FIG. 3 are the same as those of the sample-and-hold unit 102 and the detection unit 104 in FIG. 2, so further description thereof is omitted for simplicity. But, in another embodiment of the present invention, the sample-and-hold unit 102 samples a peak value of the DC voltage VDC during each period of the DC voltage VDC. For example, during the time interval T1, the sample-and-hold unit 102 samples the peak value VPL1 of the DC voltage VDC, wherein after the sample-and-hold unit 102 samples the peak value VPL1 of the DC voltage VDC, the reference voltage generation circuit 206 can generate a reference voltage VR1 corresponding to the peak value VPL1 and the time interval T1 according to the peak value VPL1. As shown in FIG. 3, before the AC power source AC is plugged out, a peak value of the DC voltage VDC (e.g. the peak value VPL1 of the DC voltage VDC during the time interval T1) corresponding to the L line of the AC power source AC is substantially equal to a peak value of the DC voltage VDC (e.g. a peak value of the DC voltage VDC during the time interval T2) corresponding to the N line of the AC power source AC, and the DC voltage VDC is regularly increased and decreased during periods of the DC voltage VDC (e.g. the time intervals T1, T2). However, when the AC power source AC is plugged out, the DC voltage VDC is not regularly increased and decreased again. Therefore, if the discharge signal generation unit 106 does not receive the detection signal DS again within a second predetermined time SP after the detection signal DS (corresponding to a time TD), the discharge signal generation unit 106 generates the discharge signal DTS to the discharge unit 112, wherein the second predetermined time SP is equal to a predetermined times of the period of the AC voltage VAC. For example, the second predetermined time SP is equal to 4 times of the period of the AC voltage VAC. But, the present invention is not limited to the second predetermined time SP being equal to 4 times of the period of the AC voltage VAC. That is to say, the second predetermined time SP can be changed with a practical requirement of the power converter. In addition, the discharge unit 112 is used for discharging the X capacitor 108 according to the discharge signal DTS, and the discharge unit 112 can discharge the voltage stored in the X capacitor 108 to make the voltage stored in the X capacitor 108 be lower than the predetermined voltage within the first predetermined time according to the discharge signal DTS.

Figure 4:
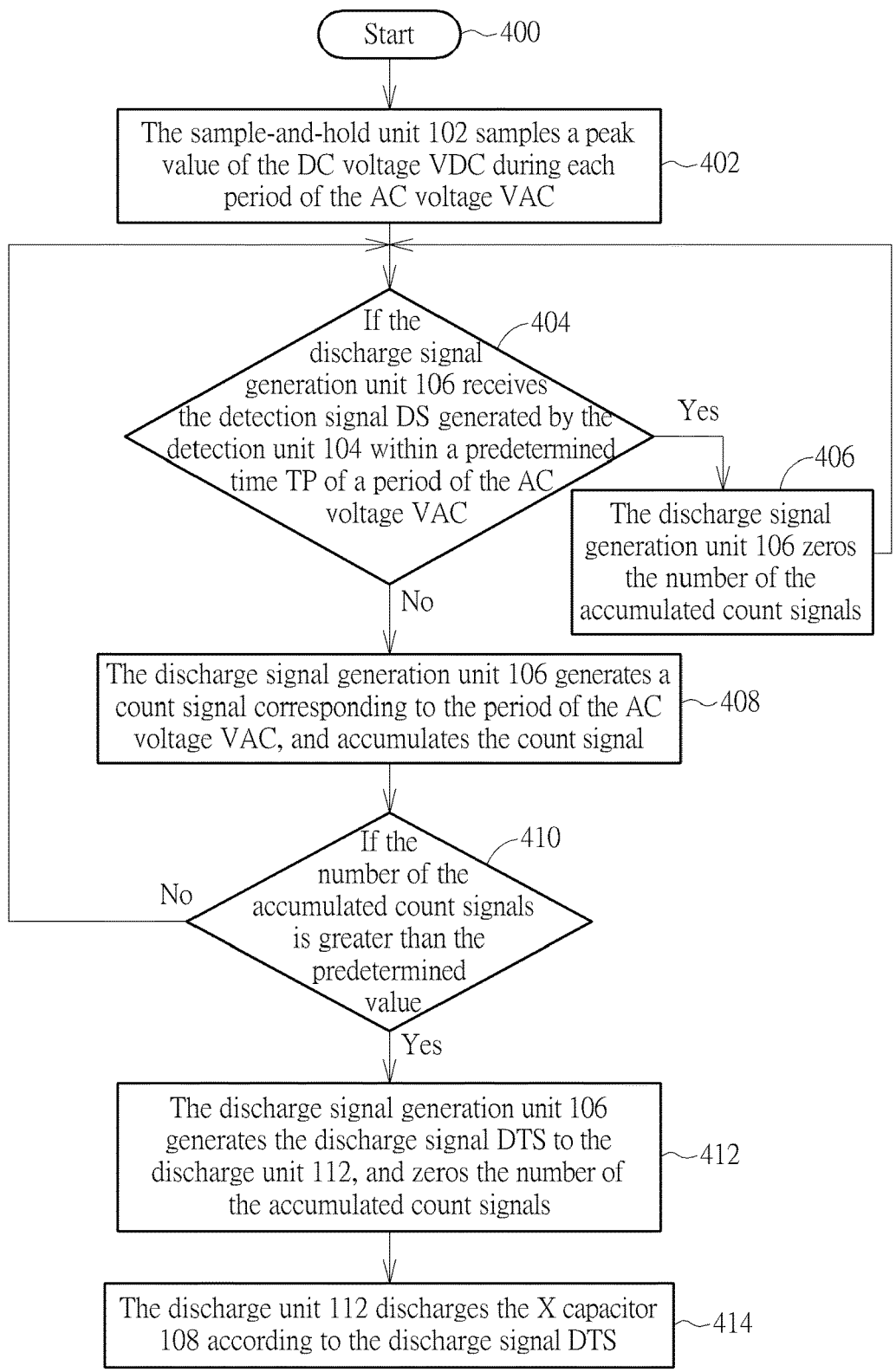
FIG. 4 is a flowchart illustrating a protection method applied to an AC power source according to a third embodiment of the present invention.

Please refer to FIGS. 1-2, 4. FIG. 4 is a flowchart illustrating a protection method applied to an AC power source according to a third embodiment of the present invention. The protection method in FIG. 4 is illustrated using the protection circuit 100 in FIG. 1. Detailed steps are as follows:

Step 400: Start.

Step 402: The sample-and-hold unit 102 samples a peak value of the DC voltage VDC during each period of the AC voltage VAC.

Step 404: If the discharge signal generation unit 106 receives the detection signal DS generated by the detection unit 104 within a predetermined time TP of a period of the AC voltage VAC; if yes, go to Step 406; if no, go to Step 408.

Step 406: The discharge signal generation unit 106 zeros the number of the accumulated count signals, go to Step 404.

Step 408: The discharge signal generation unit 106 generates a count signal corresponding to the period of the AC voltage VAC, and accumulates the count signal.

Step 410: If the number of the accumulated count signals is greater than the predetermined value; if yes, go to Step 412; if no, go to Step 404.

Step 412: The discharge signal generation unit 106 generates the discharge signal DTS to the discharge unit 112, and zeros the number of the accumulated count signals.

Step 414: The discharge unit 112 discharges the X capacitor 108 according to the discharge signal DTS.

As shown in FIG. 1, because the AC voltage VAC provided by the AC power source AC can be rectified to generate the first DC voltage V1 through the full-wave rectifier 110, and the sample-and-hold unit 102 is coupled to the two terminals of the X capacitor 108 through the high voltage pin 202 and the voltage divider 204, the period of the DC voltage VDC corresponds to the period of the AC voltage VAC (that is, the AC voltage VAC is two times of the period of the period of the DC voltage VDC) . As shown in FIG. 2, when the N line of the AC power source AC is one-line off, the DC voltage VDC is not reduced to zero, but the peak value of the DC voltage VDC (e.g. the peak value VPL1 of the DC voltage VDC during the time interval T1) corresponding to the L line of the AC power source AC is greater than the peak value of the DC voltage VDC (e.g. the peak value VPN1 of the DC voltage VDC during the time interval T2) corresponding to the N line of the AC power source AC, wherein the time interval T1 (that is, the period of the DC voltage VDC) is equal to the time interval T2, and the period of the AC voltage VAC (that is, the time interval T3) is equal to the sum of the time interval T1 and the time interval T2. Therefore, in Step 402, the sample-and-hold unit 102 samples a peak value of the DC voltage VDC during each period of the AC voltage VAC. For example, the sample-and-hold unit 102 samples the peak value VPL1 of the DC voltage VDC during the time interval T3 (equal to the period of the AC voltage VAC), wherein after the sample-and-hold unit 102 samples the peak value VPL1 of the DC voltage VDC, the reference voltage generation circuit 206 (as shown in FIG. 1) can generate the reference voltage VR1 corresponding to the peak value VPL1 and the time interval T3 according to the peak value VPL1 (that is, the reference voltage VR1 is changed with the peak value VPL1), and the reference voltage VR1 is set to be between the peak value VPL1 and the peak value VPN1. Because the reference voltage generation circuit 206 generates the reference voltage VR1 according to the peak value VPL1, the reference voltage VR1 corresponds to the voltage VH of the high voltage pin 202 (because the DC voltage VDC corresponds to the voltage VH of the high voltage pin 202). In addition, the reference voltage VR1 can be adjusted by the resistor 208, wherein when the resistance of the resistor 208 is smaller, the difference between the peak value VPL1 and the peak value VPN1 is greater, so the reference voltage VR1 can be set to be smaller, and when the resistance of the resistor 208 is greater, the difference between the peak value VPL1 and the peak value VPN1 is smaller, so the reference voltage VR1 can be set to be greater. After the reference voltage generation circuit 206 generates the reference voltage VR1 (that is, the time interval T4), when the DC voltage VDC crosses the reference voltage VR1 corresponding to the previous period of the AC voltage VAC (that is, the time interval T3), the detection unit 104 can generate the detection signal DS. In Step 406, when the discharge signal generation unit 106 receives the detection signal DS within the predetermined time TP of the period of the AC voltage VAC, the discharge signal generation unit 106 zeros the number of the accumulated count signals, wherein when the AC voltage VAC is a 60 Hz AC voltage, the period of the AC voltage VAC is equal to 16.7 ms, so the predetermined time TP can be set between T and T/2 (e.g. the predetermined time TP can be set to be equal to 0.6 T (0.6*16.7≅10 ms)), wherein T represents the period of the AC voltage VAC. But, the present invention is not limited to the predetermined time TP being equal to 0.6 T. In Step 408, when the discharge signal generation unit 106 does not receive the detection signal DS within the predetermined time TP of the period of the AC voltage VAC, the discharge signal generation unit 106 generates the count signal corresponding to the period of the AC voltage VAC, and accumulates the count signal. For example, the discharge signal generation unit 106 can generate the count signal corresponding to the time interval T4 when the discharge signal generation unit 106 does not receive the detection signal DS within the predetermined time TP of the time interval T4 (wherein the time interval T4 is equal to a period of the AC voltage VAC), and accumulates the count signal. In Step 412, when the number of the accumulated count signals accumulated by the discharge signal generation unit 106 (e.g. the number of the accumulated count signals accumulated by the discharge signal generation unit 106 during 4 consecutive periods (the time intervals T4, T5, T6, . . . ) of the AC voltage VAC) is greater than the predetermined value (e.g. the predetermined value is 3), the discharge signal generation unit 106 generates the discharge signal DTS to the discharge unit 112, and zeros the number of the accumulated count signals. In Step 414, the discharge unit 112 is used for discharging the X capacitor 108 to make the voltage stored in the X capacitor 108 be lower than the predetermined voltage within the first predetermined time (e.g. one second) according to the discharge signal DTS.

Figure 5:
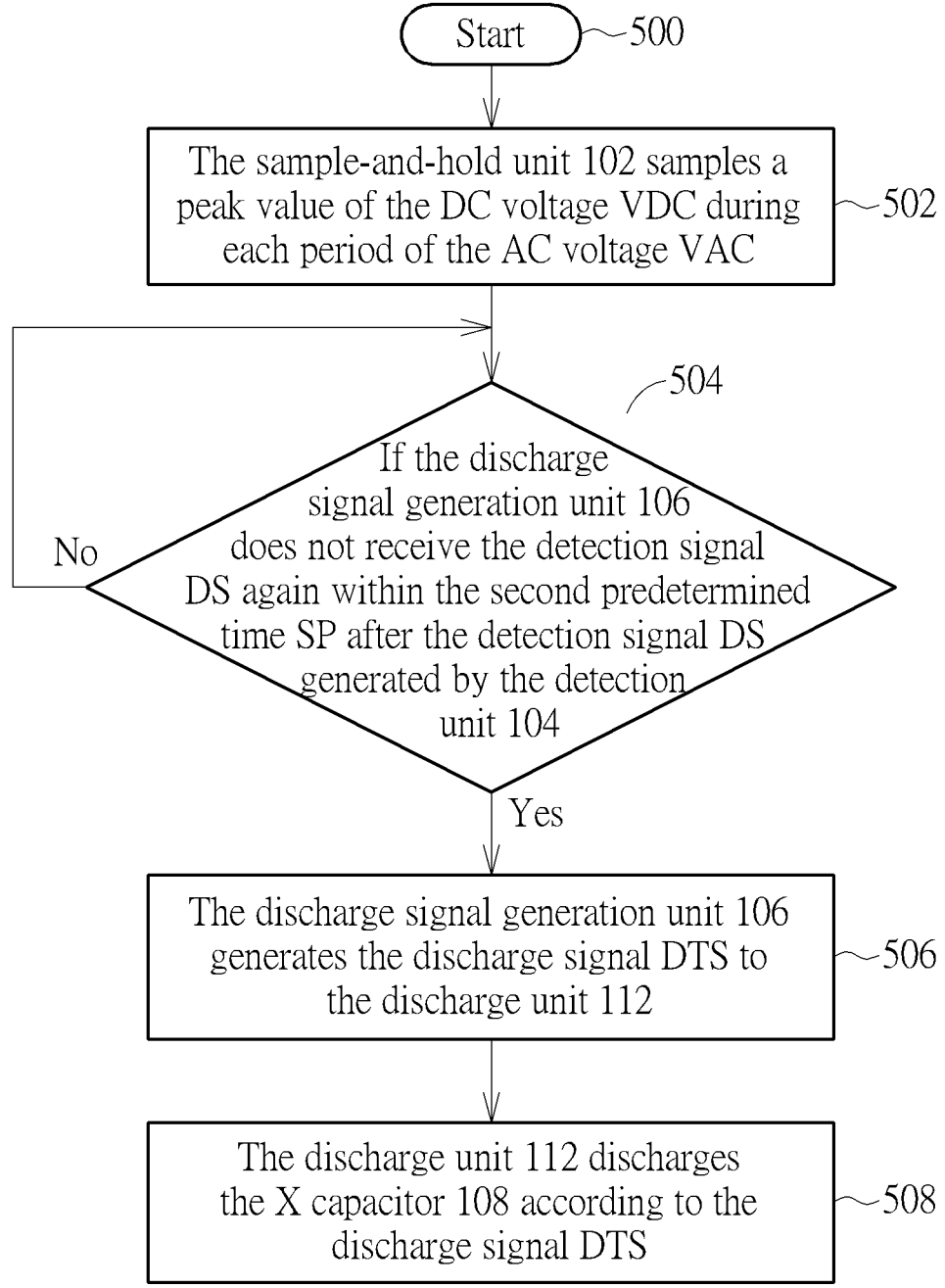
FIG. 5 is a flowchart illustrating a protection method applied to an AC power source according to a fourth embodiment of the present invention.

Please refer to FIGS. 1, 3, 5. FIG. 5 is a flowchart illustrating a protection method applied to an AC power source according to a fourth embodiment of the present invention. The protection method in FIG. 5 is illustrated using the protection circuit 100 in FIG. 1. Detailed steps are as follows:

Step 500: Start.

Step 502: The sample-and-hold unit 102 samples a peak value of the DC voltage VDC during each period of the AC voltage VAC.

Step 504: If the discharge signal generation unit 106 does not receive the detection signal DS again within the second predetermined time SP after the detection signal DS generated by the detection unit 104; if yes, go to Step 506; if no, go to Step 504.

Step 506: The discharge signal generation unit 106 generates the discharge signal DTS to the discharge unit 112.

Step 508: The discharge unit 112 discharges the X capacitor 108 according to the discharge signal DTS.

In Step 502, as shown in FIG. 3, in another embodiment of the present invention, the sample-and-hold unit 102 samples a peak value of the DC voltage VDC during each period of the DC voltage VDC. For example, during the time interval T1, the sample-and-hold unit 102 samples the peak value VPL1 of the DC voltage VDC, wherein after the sample-and-hold unit 102 samples the peak value VPL1 of the DC voltage VDC, the reference voltage generation circuit 206 can generate the reference voltage VR1 corresponding to the peak value VPL1 and the time interval T1 according to the peak value VPL1. In addition, as shown in FIG. 3, before the AC power source AC is plugged out, the peak value of the DC voltage VDC (e.g. the peak value VPL1 of the DC voltage VDC during the time interval T1) corresponding to the L line of the AC power source AC is substantially equal to the peak value of the DC voltage VDC (e.g. the peak value of the DC voltage VDC during the time interval T2) corresponding to the N line of the AC power source AC, and the DC voltage VDC is regularly increased and decreased during periods of the DC voltage VDC (e.g. the time intervals T1, T2). However, when the AC power source AC is plugged out, the DC voltage VDC is not regularly increased and decreased again. Therefore, a difference between the embodiment of the fourth embodiment and the embodiment of the third embodiment is that in Step 504, if the discharge signal generation unit 106 does not receive the detection signal DS again within the second predetermined time SP after the detection signal DS (corresponding to the time TD), the discharge signal generation unit 106 generates the discharge signal DTS to the discharge unit 112, wherein the second predetermined time SP is equal to the predetermined times of the period of the AC voltage VAC. For example, the second predetermined time SP is equal to 4 times of the period of the AC voltage VAC. But, the present invention is not limited to the second predetermined time SP being equal to 4 times of the period of the AC voltage VAC. That is to say, the second predetermined time SP can be changed with the practical requirement of the power converter. In addition, subsequent operational principles of the fourth embodiment are the same as those of the third embodiment, so further description thereof is omitted for simplicity.

To sum up, the protection circuit applied to the AC power source and the related protection method thereof utilize the sample-and-hold unit to sample a peak value of the DC voltage during each period of the AC voltage when the AC power source is one-line off, and utilize the discharge signal generation unit to generate the discharge signal to the discharge unit when the number of the accumulated count signals generated and accumulated by the discharge signal generation unit during consecutive periods of the AC voltage is greater than the predetermined value. In addition, the protection circuit applied to the AC power source and the related protection method thereof can also utilize the sample-and-hold unit to sample a peak value of the DC voltage during each period of the AC voltage when the AC power source is plugged out, and utilize the discharge signal generation unit to generate the discharge signal to the discharge unit when the discharge signal generation unit does not receive the detection signal generated by the detection unit again within the second predetermined time after the detection signal generated by the detection unit. Then, the discharge unit can discharge the X capacitor according to the discharge signal. Therefore, compared to the prior art, the present invention can prevent from misjudging that the AC power source is not turned off when the AC power source is one-line off, resulting in the X capacitor not being discharged in time. In addition, the present invention can also be simultaneously applied to plugging-out of the AC power source.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection circuit applied to an alternating current (AC) power source, comprising:
   a sample-and-hold unit for sampling a peak value of a direct current (DC) voltage during each period of a corresponding AC voltage, wherein the AC power source provides the AC voltage;
   a detection unit coupled to the sample-and-hold unit for generating a detection signal when the DC voltage crosses a reference voltage derived from the peak value within a same period of the AC voltage, wherein the reference voltage is changed with the DC voltage and corresponds to the AC voltage; and
   a discharge signal generation unit coupled to the detection unit for generating a count signal when the discharge signal generation unit does not receive the detection signal within a predetermined time of a period of the AC voltage, accumulating the count signal, and generating a discharge signal to a discharge unit when a number of accumulated count signals is greater than a predetermined value;
   wherein the discharge unit is used for discharging an X capacitor according to the discharge signal.

2. The protection circuit of claim 1, wherein when the number is greater than the predetermined value, the discharge signal generation unit zeros the number.

3. The protection circuit of claim 1, wherein when the discharge signal generation unit receives the detection signal within the predetermined time of the period of the AC voltage, the discharge signal generation unit zeros the number.

4. The protection circuit of claim 1, wherein the reference voltage is less than the peak value.

5. The protection circuit of claim 1, further comprising:
   a voltage divider coupled between a high voltage pin and ground, wherein the DC voltage is equal to a divided voltage of a voltage of the high voltage pin, and the reference voltage corresponds to a resistor coupled to the high voltage pin.

6. The protection circuit of claim 1, wherein the discharge unit discharges a voltage stored in the X capacitor to make the voltage stored in the X capacitor be lower than a predetermined voltage within a first predetermined time according to the discharge signal.

7. A protection circuit applied to an AC power source, comprising:
   a sample-and-hold unit for sampling a peak value of a DC voltage during each period of a corresponding AC voltage, wherein the AC power source provides the AC voltage;
   a detection unit coupled to the sample-and-hold unit for generating a detection signal when the DC voltage crosses a reference voltage derived from the peak value within a same period of the AC voltage, wherein the reference voltage is changed with the DC voltage and corresponds to the AC voltage; and
   a discharge signal generation unit coupled to the detection unit for generating a discharge signal to a discharge unit when the discharge signal generation unit does not receive the detection signal again within a predetermined time after the detection signal;
   wherein the discharge unit is used for discharging an X capacitor according to the discharge signal.

8. The protection circuit of claim 7, wherein the predetermined time is equal to predetermined times of a period of the AC voltage.

9. The protection circuit of claim 7, wherein the reference voltage is less than the peak value.

10. The protection circuit of claim 7, further comprising:
    a voltage divider coupled between a high voltage pin and ground, wherein the DC voltage is equal to a divided voltage of a voltage of the high voltage pin, and the reference voltage corresponds to a resistor coupled to the high voltage pin.

11. The protection circuit of claim 7, wherein the discharge unit discharges a voltage stored in the X capacitor to make the voltage stored in the X capacitor be lower than a predetermined voltage within a first predetermined time according to the discharge signal.

12. A protection method applied to an AC power source, wherein a protection circuit applied to the protection method comprises a sample-and-hold unit, a detection unit, and a discharge signal generation unit, the protection method comprising:
    sampling a peak value of a DC voltage by the ample-and-hold unit during each period of a corresponding AC voltage, wherein the AC power source provides the AC voltage;
    generating a count signal by the discharge signal generation unit when the discharge signal generation unit does not receive a detection signal generated by the detection unit within a predetermined time of a period of the AC voltage, wherein the detection unit generates the detection signal when the DC voltage crosses a reference voltage derived from the peak value within each period of the AC voltage, and the reference voltage is changed with the DC voltage and corresponds to the AC voltage;

accumulating the count signal by the discharge signal generation unit;

generating a discharge signal to a discharge unit by the discharge signal generation unit when a number of accumulated count signals is greater than a predetermined value; and discharging an X capacitor by the discharge unit according to the discharge signal.

13. The protection method of claim 12, further comprising:

the discharge signal generation unit zeroing the number when the number is greater than the predetermined value.

14. The protection method of claim 12, further comprising:

the discharge signal generation unit zeroing the number when the discharge signal generation unit receives the detection signal within the predetermined time of the period of the AC voltage.

15. The protection method of claim 12, wherein the reference voltage is less than the peak value.

16. The protection method of claim 12, wherein the discharge unit discharges a voltage stored in the X capacitor to make the voltage stored in the X capacitor be lower than a predetermined voltage within a first predetermined time according to the discharge signal.

17. A protection method applied to an AC power source, wherein a protection circuit applied to the protection method comprises a sample-and-hold unit, a detection unit, and a discharge signal generation unit, the protection method comprising:

sampling a peak value of a DC voltage by the ample-and-hold unit during each period of a corresponding AC voltage, wherein the AC power source provides the AC voltage;

generating a discharge signal to a discharge unit by the discharge signal generation unit when the discharge signal generation unit does not receive a detection signal generated by the detection unit again within a predetermined time after the detection signal, wherein the detection unit generates the detection signal when the DC voltage crosses a reference voltage derived from the peak value within each period of the AC voltage, and the reference voltage is changed with the DC voltage and corresponds to the AC voltage; and discharging an X capacitor by the discharge unit according to the discharge signal.

18. The protection method of claim 17, wherein the predetermined time is equal to predetermined times of a period of the AC voltage.

19. The protection method of claim 17, wherein the reference voltage is less than the peak value.

20. The protection method of claim 17, wherein the discharge unit discharges a voltage stored in the X capacitor to make the voltage stored in the X capacitor be lower than a predetermined voltage within a first predetermined time according to the discharge signal.

* * * * *